United States Patent
Kumamoto

(10) Patent No.: US 6,680,360 B2
(45) Date of Patent: Jan. 20, 2004

(54) PROCESS FOR PRODUCING CATALYST FOR α-OLEFIN POLYMERIZATION AND PROCESS FOR PRODUCING α-OLEFIN POLYMER

(75) Inventor: Shin-ichi Kumamoto, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/320,428

(22) Filed: Dec. 17, 2002

(65) Prior Publication Data

US 2003/0134992 A1 Jul. 17, 2003

(30) Foreign Application Priority Data

Jan. 11, 2002 (JP) ........................................ 2000-004400
Jan. 11, 2002 (JP) ........................................ 2002-004401

(51) Int. Cl.[7] .................................................. C08F 4/42
(52) U.S. Cl. ..................... 526/124.3; 526/142; 526/352; 526/125.1; 526/119; 502/103; 502/118; 502/125; 502/127; 502/126

(58) Field of Search ................................. 526/142, 352, 526/124.3, 125.1, 119; 502/103, 118, 125, 127, 126

(56) References Cited

FOREIGN PATENT DOCUMENTS

EP          1 138 701 A1  * 10/2001

* cited by examiner

*Primary Examiner*—Ling-Siu Choi
(74) *Attorney, Agent, or Firm*—Sughrue Mion, PLLC

(57) ABSTRACT

There are provided a process for producing a catalyst for α-olefin polymerization, which comprises the step of contacting (1) a solid catalyst component having Ti, Mg and a halogen as essential components, (2) an organoaluminum compound and (3) a compound having a —C—O—C—O—C— bond group in a closed ring structure with one another; and a process for producing an α-olefin polymer, which comprises the step of homopolymerizing or copolymerizing an α-olefin in the presence of a catalyst for α-olefin polymerization produced by the above process.

5 Claims, No Drawings

PROCESS FOR PRODUCING CATALYST FOR α-OLEFIN POLYMERIZATION AND PROCESS FOR PRODUCING α-OLEFIN POLYMER

FIELD OF THE INVENTION

The present invention relates to a process for producing a catalyst for α-olefin polymerization and a process for producing an α-olefin polymer.

BACKGROUND OF THE INVENTION

As disclosed in JP-A 57-63310, JP-A 58-83006 and JP-A 61-78803, there is known a process for obtaining a highly stereoregular polymer by polymerizing an α-olefin in the presence of a catalyst comprising a combination of the following catalyst components:

(1) a support type solid catalyst component obtained by supporting a tetravalent titanium halide compound on a magnesium halide, (2) an organoaluminum compound (co-catalyst) and (3) an organosilicon compound (third component).

Further, as disclosed in JP-A7-216017, there is also known a process for obtaining a highly stereoregular polymer by polymerizing an α-olefin in the presence of a catalyst comprising a combination of the following catalyst components:

(1) a solid catalyst component obtained according to a process comprising the steps of:
  (i) reducing a titanium compound with an organomagnesium compound in the presence of an organosilicon compound and an ester compound to obtaining a solid product,
  (ii) treating said solid product with an ester compound, and
  (iii) treating the treated product with either a mixture of an ether compound and titanium tetrachloride, or a mixture of an ether compound, titanium tetrachloride and an ester compound to obtain the desired solid catalyst component containing a trivalent titanium compound, (2) an organoaluminum compound (co-catalyst) and (3) an organosilicon compound (third component).

Furthermore, as disclosed in JP-A 10-212319, there is also known a process for obtaining a highly stereoregular polymer by polymerizing an α-olefin in the presence of a catalyst comprising a combination of the following catalyst components:

(1) a solid catalyst component obtained according to a process comprising the steps of:
  (i) reducing a titanium compound with an organomagnesium compound in the presence of an organosilicon compound and an ester compound to obtain a solid product,
  (ii) treating said solid product with a mixture of an ether compound and titanium tetrachloride,
  (iii) further treating the treated product with an organic acid halide compound, and
  (iv) still further treating the resulting treated product with either a mixture of an ether compound and titanium tetrachloride, or a mixture of an ether compound, titanium tetrachloride and an ester compound to obtain the desired solid catalyst component containing a trivalent titanium compound, (2) an organoaluminum compound (co-catalyst) and (3) an organosilicon compound (third component).

According to the above-mentioned processes, a highly stereoregular polymer can be produced through a no-extraction/no-deash process. However, it is desired to further improve a quality of the highly stereoregular polymer.

SUMMARY OF THE INVENTION

Objects of the present invention are to provide a process for producing a polymerization catalyst suitable for obtaining a high quality α-olefin polymer, and to provide a process for producing such an α-olefin polymer.

The present invention provides a process for producing a catalyst for α-olefin polymerization, which comprises the step of contacting (1) a solid catalyst component having Ti, Mg and a halogen as essential components, (2) an organoaluminum compound and (3) a compound having a —C—O—C—O—C— bond group in a closed ring structure with one another.

The present invention also provides a process for producing a catalyst for α-olefin polymerization, which comprises the step of contacting (1) a solid catalyst component having Ti, Mg and a halogen as essential components, (2) an organoaluminum compound, (3) a compound having a —C—O—C—O—C— bond group and (4) an alkoxysilicon compound with one another.

The present invention also provides a process for producing a catalyst for α-olefin polymerization, which comprises the step of contacting (1) a solid catalyst component having Ti, Mg and a halogen as essential components, (2) an organoaluminum compound, (3) a compound having a —C—O—C—O—C— bond group and (4) a 1,3-diether compound with one another.

The present invention also provides a process for producing a catalyst for α-olefin polymerization, which comprises the step of contacting (1) a solid catalyst component having Ti, Mg and a halogen as essential components, (2) an organoaluminum compound, (3) a compound having a —C—O—C—O—C— bond group and (4) a piperidine compound with one another.

The present invention further provides a process for producing an α-olefin polymer, which comprises the step of homopolymerizing or copolymerizing an α-olefin in the presence of a catalyst for α-olefin polymerization, which catalyst is obtained according to any of the above-mentioned processes for producing a catalyst for α-olefin polymerization.

DETAILED DESCRIPTION OF THE INVENTION

The compound having a —C—O—C—O—C— bond group in a closed ring structure used in the present invention is a compound used as a so-called external donor. As such a compound, a compound represented by the following formula is exemplified. In the formula, $R^2$ to $R^7$ are independently of one another a hydrogen atom, a hydrocarbon group having 1 to 20 carbon atoms or a hydrocarbyloxy group having 1 to 20 carbon atoms; and $R^1$ and $R^8$ are independently of each other a hydrocarbon group having 1 to 20 carbon atoms or a hydrocarbyloxy group having 1 to 20 carbon atoms, wherein both groups represented by $R^1$ and $R^8$ are bound with each other, or a left end carbon atom to which $R^1$ is bound and a right end carbon atom to which $R^8$ is bound are directly bound (in the latter case, neither $R^1$ nor $R^8$ exists).

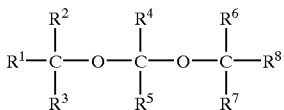

Examples of $R^2$ to $R^7$ are a hydrogen atom, a methyl group, an ethyl group, a n-propyl group, an i-propyl group, a n-butyl group, an i-butyl group, a tert-butyl, a n-pentyl group, an 1-pentyl group, a neopentyl group, a cyclopentyl group, a n-hexyl group, an 1-hexyl group, a cyclohexyl group, a n-heptyl group, a n-octyl group, 2-ethylhexyl group, a n-decyl group, an i-decyl group, a phenyl group, a methoxy group, an ethoxy group, a n-propoxy group, an i-propoxy group, a n-butoxy group, an i-butoxy group, a tert-butoxy group, a n-pentoxy group, an i-pentoxy group, a neopentoxy group, a n-hexoxy group and an i-hexoxy group.

Examples of a preferable compound represented by the above formula are 1,3-dioxolan, 2-methyl-1,3-dioxolan, 4-methyl-1,3-dioxolan, 2,2-dimethyl-1,3-dioxolan, 2,4-dimethyl-1,3-dioxolan, 2-methoxy-1,3-dioxolan, 4-methoxy-1,3-dioxolan, 2,2-dimethoxy-1,3-dioxolan, 1,3-dioxane, 2-methyl-1,3-dioxane, 4-methyl-1,3-dioxane, 2,2-dimethyl-1,3-dioxane, 2,4-dimethyl-1,3-dioxane, 2-methoxy-1,3-dioxane, 4-methoxy-1,3-dioxane, 2,2-dimethoxy-1,3-dioxane, 2,4-dimethoxy-1,3-dioxane, 1,3-dioxepane, 2-methyl-1,3-dioxepane, 4-methyl-1,3-dioxepane, 5-methyl-1,3-dioxepane, 2,4-dimethyl-1,3-dioxepane, 2,5-dimethyl-1,3-dioxepane, 2-methoxy-1,3-dioxepane, 4-methoxy-1,3-dioxepane, 5-methoxy-1,3-dioxepane and s-trioxane. Among them, particularly preferable is 1,3-dioxolan, 1,3-dioxane, 1,3-dioxepane or s-trioxane.

The compound having a —C—O—C—O—C— bond group used in the present invention is a compound used as a so-called external donor. As such a compound, a compound represented by the above formula is exemplified. In the formula, $R^1$ to $R^8$ are independently of one another a hydrogen atom, a hydrocarbon group having 1 to 20 carbon atoms or a hydrocarbyloxy group having 1 to 20 carbon atoms. Any groups represented by $R^1$ to $R^8$ may be bound with one another, and any two of three carbon atoms to which $R^1$ to $R^8$ are bound may be directly bound with each other. For example, a central carbon atom to which $R^4$ is bound and a right end carbon atom to which $R^6$ is bound may be directly bound with each other. In this case, neither $R^4$ nor $R^6$ exists. Examples of $R^1$ to $R^8$ are similar to those exemplified for the above-mentioned $R^2$ to $R^7$.

Examples of a compound wherein any combination of $R^1$ to $R^8$ has no bond therein are dimethylacetal, diethylacetal, propylenealdehyde dimethylacetal, n-octylaldehyde dimethyl acetal, benzaldehyde dimethylacetal, 2,2-dimethoxypropane, 3,3-dimethoxyhexane and 2,6-dimethyl-4,4-dimethoxyheptane.

Examples of compounds wherein any groups of $R^1$ to $R^8$ are bound to each other, or examples of compounds wherein any two carbon atoms of three carbon atoms having bonds to $R^1$ to $R^8$ are bound directly to each other are, as well as each compound exemplified above as a compound having the —C—O—C—O—C— bond group in its closed ring structure, 1,1-dimethoxycyclopentane, 1,1-dimethoxycyclohexane, 1,1-diethoxycyclopentane, 1,1-diethoxycyclohexane, 2-methoxytrimethylene oxide, 2-ethoxytrimethylene oxide, 2,4-dimethoxytrimethylene oxide, 2,4-diethoxytrimethylene oxide, 2-methoxytetrahydrofuran, 2-ethoxytetrahydrofuran, 2,5-dimethoxytetrahydrofuran, 2,5-diethoxytetrahydrofuran, 2-methoxytetrahydropyran, 2-ethoxytetrahydropyran, 2,6-dimethoxytetrahydropyran and 2,6-diethoxytetrahydropyran. Among them, preferable is a compound wherein $R^1$ and $R^8$ are bound to each other, or a compound wherein $R^1$ and $R^8$ do not exist and two carbons bound to each of $R^1$ and $R^8$ are bound directly to each other, namely, a compound having a —C—O—C—O—C— bond group in a closed ring structure. Particularly preferable is 1,3-dioxolan, 1,3-dioxane, 1,3-dioxepane or s-trioxane.

A preferable example of the alkoxysilicon compound used in the present invention is that represented by the following formula. In the formula, $R^3$ is a hydrocarbon group having 1 to 20 carbon atoms, a hydrogen atom or a hetero atom-containing substituent; $R^4$ is a hydrocarbon group having 1 to 20 carbon atoms; r is a number satisfying $0 \leq r < 4$; and all $R^3$s and all $R^4$s are the same or different from each other, respectively.

$$R^3{}_r Si(OR4)_{4-r}$$

Examples of $R^3$ as the hydrocarbon group in the above formula are straight chain alkyl groups such as methyl, ethyl, propyl, butyl and pentyl groups; branched chain alkyl groups such as isopropyl, sec-butyl, tert-butyl and tert-amyl groups; cycloalkyl groups such as a cyclopentyl group; cycloalkyl groups such as cyclopentyl and cyclohexyl groups; cycloalkenyl groups such as a cyclopentenyl group; and aryl groups such as phenyl and tolyl groups. Examples of $R^4$ as the hydrocarbon group in the above formula are the same groups as these groups.

Examples of the hetero atom in $R^3$ as the hetero atom-containing substituent in the above formula are an oxygen atom, a nitrogen atom, a sulfur atom and a phosphorus atom. Examples of the hetero atom-containing substituent are a dimethylamino group, a methylethylamino group, a diethylamino group, an ethyl-n-propylamino group, a di-n-propylamino group, a pyrrolyl group, a pyridyl group, a pyrrolidinyl group, a piperidinyl group, a perhydroindolyl group, a perhydroisoindolyl group, a perhydroquinolyl group, a perhydroisoquinolyl group, a perhydrocarbazoly group, a perhydroacridinyl group, a furil group, a pyranyl group, a perhydrofuril group and a thienyl group. Among them, preferable is a substituent wherein a hetero atom is able to make a direct bond to a silicon atom in an alkoxysilicon compound.

A preferable alkoxysilicon compound is an alkoxysilicon compound having at least one $R^3$, which has a secondary or tertiary carbon atom bound directly to silicon atom in the above formula. Examples of preferable alkoxysilicon compounds are diisopropyl dimethoxysilane, diisobutyldimethoxysilane, di-tert-butyldimethoxysilane, tert-butylmethyldimethoxy silane, tert-butylethyldimethoxysilane, tert-butyl-n-propyldimethoxysilane, tert-butyl-n-butyldimethoxysilane, tert-amylmethyldimethoxy silane, tert-amylethyldimethoxysilane, tert-amyl-n-propyldimethoxysilane, tert-amyl-n-butyldimethoxysilane, isobutylisopropyl dimethoxysilane, tert-butylisopropyldimethoxysilane, dicyclobutyldimethoxysilane, cyclobutylisopropyldimethoxy silane, cyclobutylisobutyldimethoxysilane, cyclobutyl-tert-butyldimethoxysilane, dicyclopentyldimethoxysilane, cyclopentylisopropyl dimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexylisopropyl dimethoxysilane, cyclohexylisobutyldimethoxysilane, cyclo-hexyl-tert-butyldimethoxysilane, cyclohexylcyclopentyldimethoxy silane, cyclohexylphenyldimethoxysilane, diphenyldimethoxy silane, phenylmethyldimethoxysilane, phenylisopropyldimethoxy silane, phenylisobutyldimethoxysilane, phenyl-tert-butyldimethoxy silane, phenylcyclopentyldimethoxysilane, diisopropyl-diethoxysilane, diisobutyldiethoxysilane, di-tert-butyl-diethoxysilane, tert-butylmethyldiethoxysilane, tert-butylethyldiethoxysilane, tert-butyl-n-propyldiethoxy silane, tert-butyl-n-butyldiethoxysilane, tert-amylmethyldiethoxysilane, tert-amylethyldithoxysilane, tert-amyl-n-propyldiethoxysilane, tert-amyl-n-butyldiethoxy silane, dicyclopentyldiethoxysilane, dicyclohexyldiethoxy silane, cyclohexylmethyldiethoxysilane, cyclohexylethlydiethoxysilane, diphenyldiethoxysilane, phenylmethyldiethoxy silane, 2-norbornanemethyldimethoxysilane, bis(perhydroquinolino)dimethoxysilane, bis(perhydroisoquinolino)dimethoxysilane, (perhydroquinolino)(perhydroisoquinolino) dimethoxysilane, (perhydroquinolino) methyldimethoxysilane, (perhydroisoquinolino) methyldimethoxysilane, (perhydroquinolino) ethyldimethoxysilane, (perhydroisoquinolino) ethyldimethoxysilane, (perhydroquinolino)(n-propyl) dimethoxysilane, (perhydroisoquinolino)(n-propyl) dimethoxysilane, (perhydroquinolino)(tert-butyl) dimethoxysilane and (perhydroisoquinolino)(tert-butyl) dimethoxysilane.

The piperidine compound used in the present invention means a compound having a piperidine structure therein. As the compound, there can be exemplified a compound represented by the following formula. In the formula, $R^1$ to $R^{11}$ are independently of one another a hydrogen atom, or a straight chain, branched chain or alicyclic alkyl group having 1 to 20 carbon atoms.

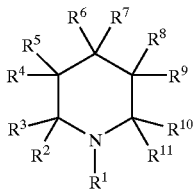

Examples of the compounds are 1-methylpiperidine, 1-ethyl piperidine, 1-n-propylpiperidine, 1-isopropylpiperidine, 2-methylpiperidine, 2-ethylpiperidine, 2-n-propylpiperidine, 2-isopropylpiperidine, 3-methylpiperidine, 3-ethylpiperidine, 3-n-propylpiperidine, 3-isopropylpiperidine, 4-methyl piperidine, 4-ethylpiperidine, 4-n-propyl piperidine, 4-isopropylpiperidine, 1,2-dimethylpiperidine, 1,3-dimethyl piperidine, 1,4-dimethylpiperidine, 2,3-dimethylpiperidine, 2,3-diethylpiperidine, 2,4-dimethylpiperidine, 2,4-diethyl piperidine, 2,5-dimethylpiperidine, 2,5-diethylpiperidine, 2,6-dimethylpiperidine, 2,6-diethyl piperidine, 2,6-n-propyl piperidine, 2,6-diisopropylpiperidine, 2,4,6-trimethylpiperidine, 2,2,6,6-tetramethylpiperidine, 2,2,6,6-tetraethylpiperidine and a combination of two or more thereof. Among them, preferable is 2,6-dimethylpiperidine or 2,2,6,6-tetramethylpiperidine.

The solid catalyst component used in the present invention may be that known in the art. Examples of the solid catalyst component acre those disclosed in JP-B 46-34092, JP-B 47-41676, JP-B55-23561, JP-B57-24361, JP-B52-39431, JP-B52-36786, JP-B 1-28049, JP-B3-43283, JP-A4-80044, JP-A55-52309, JP-A58-21405, JP-A 61-181807, JP-A 63-142008, JP-A 5-339319, JP-A 54-148093, JP-A 4-227604, JP-A 6-2933, JP-A 64-6006, JP-A 6-179720, JP-B 7-116252, JP-A 8-134124, JP-A 9-31119, JP-A 11-228628, JP-A 11-80234 and JP-A 11-322833.

A preferable solid catalyst component is that having further an electron donor as well as Ti, Mg and halogen atoms. As the electron donor, organic acid esters or ethers are preferable, both of which are mentioned hereinafter.

As a process for producing the solid catalyst component, the following processes 1 to 5 are exemplified. Of these, the process 5 is preferred.

Process 1: process comprising the step of contacting a magnesium halide compound and a titanium compound with each other.

Process 2: process comprising the step of contacting a magnesium halide compound, an electron donor and a titanium compound with one another.

Process 3: process comprising the steps of (i) dissolving a magnesium halide compound and a titanium compound in an electron donating solvent to form a solution, and then (ii) impregnating the solution to a carrier substance.

Process 4: process comprising the step of contacting a dialkoxymagnesium compound, a titanium halide compound and an electron donor with one another.

Process 5: process comprising the step of contacting a solid component containing a magnesium atom, a titanium atom and a hydrocarbyloxy group, a halogenocompound and an electron donor and/or an organic acid halide with one another.

The above-mentioned solid component is a solid substance containing at least a magnesium atom, a titanium atom and a hydrocarbyloxy group. A content of the hydrocarbyloxy group in the solid component is preferably not less than 20% by weight, and more preferably not less than 25% by weight, provided that an amount of the solid component is 100% by weight.

A preferable solid component is that obtained by reducing a titanium compound represented by the following formula [I] with an organomagnesium compound in the presence of an organosilicon compound having an Si—O bond. In this case, it is preferable that an ester compound as an optional component coexists from a view point of improving a polymerization activity and a stereoregular polymerization ability of a polymerization catalyst obtained. In the following formula [I] a is a number of 1 to 20, preferably $1 \leq a \leq 5$, and more preferably 1, 2 or 4; $R^2$ is a hydrocarbon group having 1 to 20 carbon atoms; and $X^2$ is a halogen atom or a hydrocarbyloxy group having 1 to 20 carbon atoms, wherein all $X^2$s may be the same or different from each other.

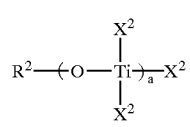

Examples of the above-mentioned organosilicon compound are those represented by the following formulas. In these formulas, $R^{10}$ is a hydrocarbon group having 1 to 20 carbon atoms; $R^{11}$, $R^{12}$, $R^{13}$, $R^{14}$ and $R^{15}$ are independently of one another a hydrocarbon group having 1 to 20 carbon atoms or a hydrogen atom; t is a number satisfying $0 < t \leq 4$;

u is an integer of from 1 to 1000; and v is an integer of from 2 to 1000.

$$Si(OR^{10})_tR^{11}_{4-t}$$

$$R^{12}(R^{13}_2SiO)_uSiR^{14}_3 \text{ and}$$

$$(R^{15}_2SiO)_v$$

Specific examples of the organosilicon compound are tetramethoxysilane, dimethyldimethoxysilane, tetraethoxysilane, triethoxyethylsilane, diethoxydiethylsilane, ethoxytriethylsilane, tetra-i-propoxysilane, di-i-propoxy-di-i-propylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethyl polysiloxane, diphenyl polysiloxane, methylhydro polysiloxane and phenylhydro polysiloxane.

Among the above-mentioned three formulas, preferable are alkoxysilane compounds represented by the first formula, wherein t is preferably a number satisfying $1 \leq t \leq 4$. Of these, tetraalkoxysilane compounds of t=4 are particularly preferred, and the most preferred is tetraethoxysilane.

Examples of $R^2$ in the above formula [I] are alkyl groups such as methyl, ethyl, propyl, i-propyl, butyl, i-butyl, amyl, i-amyl, hexyl, heptyl, octyl, decyl and dodecyl groups; aryl groups such as phenyl, cresyl, xylyl and naphthyl groups; cycloalkyl groups such as cyclohexyl and cyclopentyl groups; allyl groups such as a propenyl group; and aralkyl groups such as a benzyl group. Among these, alkyl groups having 2 to 18 carbon atoms or aryl groups having 6 to 18 carbon atoms are preferred, and straight chain alkyl groups having 2 to 18 carbon atoms are particularly preferred.

As the halogen atom represented by $X^2$ in the above formula [I], a chlorine atom, a bromine atom and an iodine atom are exemplified. Of these, a chlorine atom is particularly preferred. As the hydrocarbyloxy groups having 1 to 20 carbon atoms represented by $X^2$, there are exemplified the hydrocarbyloxy groups having the same groups as $R^2$'s mentioned above. An alkoxy group having a straight chain alkyl group of 2 to 18 carbon atoms is particularly preferred as $X^2$.

Examples of titanium compounds represented by the above formula [I] are tetramethoxytitanium, tetraethoxytitanium, tetra-n-propoxytitanium, tetra-iso-propoxytitanium, tetra-n-butoxytitanium, tetra-iso-butoxytitanium, n-butoxytitaniumtrichloride, di-n-butoxytitaniumdichloride, tri-n-butoxytitanium chloride, di-n-tetraisopropyl polytitanate (a mixture of compounds of a=2 to 10), tetra-n-butyl polytitanate (a mixture of compounds of a=2 to 10), tetra-n-hexyl polytitanate (a mixture of compounds of a=2 to 10), tetra-n-octyl polytitanate (a mixture of compounds of a=2 to 10), a condensate of a tetraalkoxytitanium obtained by reacting a tetralkoxytitanium with a small amount of water, and a combination of at least two of these compounds. Among them, particularly preferable is tetra-n-butoxytitanium, tetra-n-butyltitanium dimer or tetra-n-butyltitanium tetramer.

The above-mentioned organomagnesium compound means any organomagnesium compound having a magnesium-carbon bond. Among them, a Grignard compound or a dihydrocarbyl magnesium represented by the following formulas is particularly preferable. In the formulas, Mg is a magnesium atom; each of $R^{16}$, $R^{17}$ and $R^{18}$ is a hydrocarbon group having 1 to 20 carbon atoms, and $R^{17}$ and $R^{18}$ may be the same or different from each other; and $X^5$ is a halogen atom.

$$R^{16}MgX^5$$

$$R^{17}R^{18}Mg$$

Specific examples of $R^{16}$ to $R^{18}$ are alkyl, aryl, aralkyl and alkenyl groups having 1 to 20 carbon atoms such as methyl, ethyl, propyl, 1-propyl, butyl, sec-butyl, tert-butyl, i-amyl, hexyl, octyl, 2-ethylhexyl, phenyl and benzyl groups. It is particularly recommendable to use the Grignard compound in the form of an ether solution thereof from a viewpoint of performance of the catalyst obtained.

It is permitted to use the organomagnesium compound in combination with an organometallic compound to form a hydrocarbon soluble complex. Examples of the organometallic compounds are compounds of Li, Be, B, Al and Zn.

As the above-mentioned ester compound, a mono-carboxylic acid ester and a poly-carboxylic acid ester are exemplified. As these compounds, for example, saturated aliphatic carboxylic acid esters, unsaturated aliphatic carboxylic acid esters, alicyclic carboxylic acid esters and aromatic carboxylic acid esters are enumerated.

Specific examples of the ester compounds are methyl acetate, ethylacetate, phenylacetate, methylpropionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, di-i-propyl phthalate, di-n-butyl phthalate, di-i-butyl phthalate, di-n-octyl phthalate and diphenyl phthalate. Among them, unsaturated aliphatic carboxylic acid esters such as methacrylic acid esters and maleic acid esters, and aromatic carboxylic acid esters such as phthalic acid esters are preferred. Dialkyl phthalates are particularly preferred.

The titanium compound, the organosilicon compound and the ester compound are preferably dissolved in or diluted with a suitable solvent, and then used. Examples of the solvent are aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, di-i-amyl ether and tetrahydrofuran.

A temperature of the reduction reaction is usually from $-50$ to $70°$ C., preferably from $-30$ to $50°$ C., and particularly preferably from $-25$ to $35°$ C. A time required for the reduction reaction is not particularly limited, and it is usually from about 30 minutes to about 6 hours. After the reaction is carried out at the above-mentioned temperature, it is permitted to further carry out a post-reaction at a temperature of from 20 to $120°$ C.

Those compounds used in the reduction reaction may be used in combination with a porous carrier such as an inorganic oxide or an organic polymer, in order that the obtained solid product is impregnated in the porous carrier. The porous carrier may be a conventional one. Examples of the porous carrier are porous inorganic oxides such as $SiO_2$, $Al_2O_3$, $MgO$, $TiO_2$ and $ZrO_2$; and organic porous polymers such as polystyrene, styrene-divinylbenzene copolymer, styrene-ethylene glycol-methyl dimethacrylate copolymer, polymethyl acrylate, polyethyl acrylate, methyl acrylate-divinylbenzene copolymer, polymethyl methacrylate, methyl methacrylate-divinylbenezene copolymer, polyacrylonitrile, acrylonitrile-divinylbenezene copolymer, polyvinyl chloride, polyethylene and polypropylene. Of these, preferred are organic porous polymers, and particularly preferred is a styrene-divinylbenzene copolymer or an acrylonitrile-divinylbenzene copolymer.

A pore volume of the porous carrier in a pore radius of from 200 to 2000 Å is preferably not less than 0.3 cc/g and more preferably not less than 0.4 cc/g; and a ratio of said pore volume to a pore volume in a pore radius of from 35 to 75000 Å is preferably not less than 35% and more preferably not less than 40%. When said pore volume is less than 0.3 cc/g or the ratio is less than 35%, the solid product may not be impregnated effectively in the porous carrier.

The organosilicon compound is used in an amount of usually from 1 to 500, preferably from 1 to 300, and particularly preferably from 3 to 100 in terms of an atomic ratio, Si/Ti, i.e. a ratio of a silicon atom in the organosilicon compound to a titanium atom in the titanium compound used.

The organomagnesium compound is used in an amount of usually from 0.1 to 10, preferably from 0.2 to 5.0, and particularly preferably from 0.5 to 2.0 in terms of an atomic ratio, (Ti+Si)/Mg, i.e. a ratio of the sum of a titanium atom in the titanium compound used and a silicon atom in the organosilicon compound used to a magnesium atom in the organomagnesium compound.

Each of the titanium compound, the organosilicon compound and the organomagnesium compound may be used in an amount of usually from 1 to 51, preferably from 2 to 31, and particularly preferably from 4 to 26 in terms of an atomic ratio, Mg/Ti, i.e. a ratio of a magnesium atom in the solid catalyst component obtained to a titanium atom therein.

The ester compound (optional component) is used in an amount of usually from 0.5 to 100, preferably from 1 to 60, and particularly preferably from 2 to 30 in terms of a molar ratio, ester compound/Ti, i.e. a ratio of the ester compound used to a titanium atom in the titanium compound used.

The solid product obtained by the reduction reaction is usually separated by solid-liquid separation, and washed several times with an inert hydrocarbon solvent such as hexane, heptane and toluene.

The solid component comprises a three valence titanium atom, a magnesium atom and a hydrocarbyloxy group, and generally shows an amorphous state or a very week crystalline state. In view of catalyst performance, an amorphous solid component is particularly preferable.

The halogenocompound having halogenation ability used in the present invention means any compound, which is able to substitute the hydrocarbyloxy group in the solid component with a halogen atom thereof. Among them, a halogenocompound of the Group 4 elements, a halogenocompound of the Group 13 elements or a halogenocompound of the Group 14 elements is preferable.

As the halogenocompound of the Group 4 elements, those represented by the following formula are preferable. In this formula, M is a Group 4 element; $R^9$ is a hydrocarbon group having 1 to 20 carbon atoms; $X^4$ is a halogen atom; and b is a number satisfying $0 \leq b \leq 4$, preferably $0 \leq b \leq 2$, and particularly preferably b=0. Examples of M are Ti, Zr and Hf, and Ti is preferable.

$$M(OR^9)_b X^4_{4-b}$$

Examples of $R^9$ are alkyl groups such as methyl, ethyl, propyl, isopropyl, butyl, isobutyl, tert-butyl, amyl, isoamyl, tert-amyl, hexyl, heptyl, octyl, decyl and dodecyl groups; aryl groups such as phenyl, cresyl, xylyl and naphthyl groups; allyl groups such as a propenyl group; and aralkyl groups such as a benzyl group. Among them, alkyl groups having 2 to 18 carbon atoms or aryl groups having 6 to 18 carbon atoms are preferred, and straight chain alkyl groups having 2 to 18 carbon atoms are particularly preferred. The halogen compound of the Group 4 elements may be a compound having at least two $OR^9$ groups different from one another.

As $X^4$ in the above formula, a chlorine atom, a bromine atom and an iodine atom are exemplified. Of these, a chlorine atom is particularly preferred.

Specific examples of the halogenocompound represented by the above formula are titanium tetrahalides such as titanium tetrachloride, titanium tetrabromide and titanium tetraiodide; alkoxytitanium trihalides such as methoxytitanium trichloride, ethoxytitanium trichloride, butoxytitanium trichloride, phenoxytitanium trichloride and ethoxytitanium tribromide; dialkoxytitanium dihalides such as dimethoxytitanium dichloride, diethoxytitanium dichloride, dibutoxytitanium dichloride, diphenoxytitanium dichloride and diethoxytitanium dibromide; and those obtained by changing "titanium" in the above compounds to zirconium or hafnium. Among these compounds, the most preferred is titanium tetrachloride.

As the halogenocompound of the Group 13 elements or the halogenocompound of the Group 14 elements, those represented by the following formula are preferable. In the formula, M is the Group 13 or 14 element; R is a hydrocarbon group having 1 to 20 carbon atoms; X is a halogen atom such as F, Cl, Br and I, and among them Cl is preferable; m is a valence of M (for example, when M is Si, m is 4); and a is a number satisfying $0 < a \leq m$ (for example, when M is Si, a is preferably 3 or 4).

$$MR_{m-a}X_a$$

As the Group 13 elements, B, Al, Ga, In and Tl are exemplified. Of these, preferred is B or Al, and more preferred is Al. As the Group 14 element, C, Si, Ge, Sn and Pb are exemplified. Of these, preferred is Si, Ge or Sn.

As R in the above formula, there are exemplified alkyl groups such as a methyl group, an ethyl group, a n-propyl group, an isopropyl group, a n-butyl group, an isobutyl group, an amyl group, an isoamyl group, a hexyl group, a heptyl group, an octyl group, a decyl group and a dodecyl group; aryl groups such as a phenyl group, a tolyl group, a cresyl group, a xylyl group and a naphthyl group; cycloalkyl groups such as a cyclohexyl group and cyclopentyl group; allyl groups such as a propenyl group; and aralkyl groups such as a benzyl group. Of these, alkyl groups or aryl groups are preferred, and a methyl group, an ethyl group, a n-propyl group, a phenyl group or a p-tolyl group is particularly preferred.

As the halogenocompound of the Group 13 elements, there are exemplified trichloroboron, methyldichloroboron, ethyldichloroboron, phenyldichloroboron, cyclohexyldichloroboron, dimethylchloroboron, methylethylchloroboron, trichloroaluminum, methyldichloroaluminum, ethyldichloroaluminum, phenyldichloroaluminum, cyclohexyldichloroaluminum, dimethylchloroaluminum, diethylchloroaluminum, methylethylchloroaluminum, ethylaluminum sesquichloride, gallium chloride, gallium dichloride, trichlorogallium, methyldichlorogallium, ethyldichlorogallium, phenyldichlorogallium, cyclohexyldichlorogallium, dimethylchlorogallium, methylethylchlorogallium, indium chloride, indium trichloride, methylindium dichloride, phenylindium dichloride, dimethylindium chloride, thallium chloride, thallium trichloride, methylthallium dichloride, phenylthallium dichloride, dimethylthallium chloride, and compounds formed by replacing the chloro in the above compounds with fluoro, bromo or iodo.

Specific examples of the halogenocompounds of the group 14 elements are tetrachloromethane, trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, di-i-butyldichlorotin, diphenyldichlorotin, divinyldichlorotin, methyltrichlorotin, phenyltrichlorotin, dichlorolead, methylchlorolead and phenylchlorolead, and compounds named by replacing the chloro in the above named compounds with F, Br and I, respectively.

As the halogenocompound, particularly preferred is tetrachlorotitanium, methyldichloroaluminum, ethyldichloroaluminum, tetrachlorosilane, phenyltrichlorosilane, methyltrichlorosilane, ethyltrichlorosilane, n-propyltrichlorosilane or tetrachlorotin, from a viewpoint of polymerization activity. The above compounds may be used in combination of two or more thereof.

When an electron donor is used in the present invention, a polymerization catalyst, which produces a more highly stereoregular polymer, can be obtained.

Examples of the electron donor are oxygen-containing electron donor compounds such as ethers, ketones, aldehydes, carboxylic acids, organic acid esters, inorganic acid esters, organic acid amides, inorganic acid amides and acid anhydrides; and nitrogen-containing electron donor compounds such as ammonia, amines, nitriles and isocyanates. Of these, organic acid esters, ethers or a combination thereof are preferred, and carboxylic acid esters, ethers or a combination thereof are more preferred.

As the carboxylic acid esters, for example, mono-carboxylic acid esters and poly-carboxylic acid esters are enumerated. More specifically, saturated aliphatic carboxylic acid esters, unsaturated aliphatic carboxylic acid esters, alicyclic carboxylic acid esters and aromatic carboxylic acid esters are enumerated.

Specific examples of the carboxylic acid esters are methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, di-i-propyl phthalate, di-n-butyl phthalate, di-i-butyl phthalate, di-n-octyl phthalate and diphenyl phthalate. Among these carboxylic acid esters, unsaturated aliphatic carboxylic acid esters such as methacrylic acid esters and maleic acid esters, and aromatic carboxylic acid esters such as benzoic acid esters and phthalic acid esters are preferred. Aromatic polycarboxylic acid esters are particularly preferred, and dialkyl phthalates are most preferred.

Preferable examples of the ethers are dialkyl ethers, diethers represented by the following formula and a combination of two or more thereof. In the formula, $R^5$ to $R^8$ are independently of one another a straight chain alkyl group, a branched chain alkyl group, an alicyclic group, an aryl group or an aralkyl group having 1 to 20 carbon atoms, provided that $R^6$ and $R^7$ may be independently of each other a hydrogen atom.

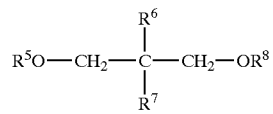

Preferable examples of the ethers are dimethyl ether, diethyl ether, di-n-butyl ether, methyl ethyl ether, methyl-n-butyl ether, methyl cyclohexyl ether, 2,2-di-i-butyl-1,3-dimethoxypropane, 2-i-propyl-2-i-pentyl-1,3-dimethoxypropane, 2,2-bis(cyclohexylmethyl)-1,3-dimethoxypropane, 2-i-propyl-2-3,7-dimethyloctyl-1,3-dimethoxypropane, 2,2-di-i-propyl-1,3-dimethoxypropane, 2-i-propyl-2-cyclohexylmethyl-1,3-dimethoxypropane, 2,2-dicyclohexyl-1,3-dimethoxypropane, 2-i-propyl-2-i-butyl-1,3-dimethoxypropane, 2,2-di-i-propyl-1,3-dimethoxypropane, 2,2-di-propyl-1,3-dimethoxypropane, 2-i-propyl-2-cyclohexyl-1,3-dimethoxypropane, 2-i-propyl-2-cyclopentyl-1,3-dimethoxypropane, 2,2-di-cyclopentyl-1,3-dimethoxypropane and 2-heptyl-2-pentyl-1,3-dimethoxypropane, and a combination of two or more thereof.

As the ethers, dialkyl ethers are particularly preferred, and di-n-butyl ethers are most preferred. Hereinafter, di-n-butyl ethers is simply referred to as dibutyl ether or butyl ether.

The 1,3-diether compound used in the present invention means a compound having a 1,3-dialkoxypropane structure therein. Examples of the compound are those wherein $R^5$ to $R^8$ in the diether compound represented by the above formula are independently of one another an alkyl group, an aryl group or an aralkyl group having 1 to 20 carbon atoms, provided that $R^6$ and $R^7$ may be independently of each other a hydrogen atom.

Specific examples of the compound are 2,2-diisobutyl-1,3-dimethoxypropane, 2-isopropyl-2-isopentyl-1,3-dimethoxy propane, 2,2-bis(cyclohexylmethyl)-1,3-dimethoxypropane, 2-isopropyl-2-3,7-dimethyloctyl-1,3-dimethoxy propane, 2,2-diisopropyl-1,3-dimethoxypropane, 2-isopropyl-2-cyclo hexylmethyl-1,3-dimethoxypropane, 2,2-dicyclohexyl-1,3-dimethoxypropane, 2-isopropyl-2-isobutyl-1,3-dimethoxy propane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxy propane, 2,2-dicyclopentyl-1,3-dimethoxypropane, 2-heptyl-2-pentyl-1,3-dimethoxy propane, and a combination of two or more thereof. Among them, preferable is 2,2-diisobutyl-1,3-dimethoxypropane, 2,2-diisopropyl-1,3-dimethoxypropane or 2,2-dicyclohexyl-1,3-dimethoxypropane.

As the organic acid halide used in the present invention, preferable is a monocarboxylic acid halide or a polycarboxylic acid halide. As the organic acid halides, aliphatic carboxylic acid halides, alicyclic carboxylic acid halides and aromatic carboxylic acid halides are enumerated. Specific examples thereof are acetyl chloride, propionic chloride, butyric chloride, valeric chloride, acrylic chloride, methacrylic chloride, benzoic chloride, toluic chloride, anisic chloride, succinic chloride, malonic chloride, maleic chloride, itaconic chloride and phthalic chloride. Of these, aromatic carboxylic acid chlorides such as benzoic chloride, toluic chloride and phthalic chloride are preferred. Aromatic dicarboxylic acid dichlorides are more preferred, and phthalic chloride is particularly preferred.

The contact in the above-mentioned process 5 is usually carried out in an atmosphere of an inert gas such as nitrogen and argon. Examples of the contacting method are as follows.

Method (1): method comprising the step of adding the halogenocompound and the electron donor to the solid component to effect the contact, wherein an addition order is limited.

Method (2): method comprising the step of adding the halogenocompound and the organic acid halide to the solid component to effect the contact, wherein an addition order is limited.

Method (3): method comprising the step of adding a mixture of the halogenocompound, the electron donor and the organic acid halide to the solid component to effect the contact.

Method (4): method comprising the step of adding a mixture of the halogenocompound and the electron donor, and the organic acid halide to the solid component to effect the contact, wherein an addition order is limited.

Method (5): method comprising the steps of (i) adding the electron donor to the solid component to effect the contact, and thereafter (ii) adding thereto the halogenocompound to effect the contact.

Method (6): method comprising the steps of (i) adding the electron donor to the solid component to effect the contact, and thereafter (ii) adding thereto the halogenocompound and the electron donor to effect the contact, wherein an addition order is limited.

Method (7): method comprising the steps of (i) adding the electron donor to the solid component to effect the contact, and thereafter (ii) adding thereto a mixture of the halogenocompound and the electron donor to effect the contact.

Method (8): method comprising the step of adding the solid component and the electron donor to the halogenocompound to effect the contact, wherein an addition order is limited.

Method (9): method comprising the step of adding the solid component and the organic acid halide to the halogenocompound to effect the contact, wherein an addition order is limited.

Method (10): method comprising the step of adding the solid component, the electron donor and the organic acid halide to the halogenocompound to effect the contact, wherein an addition order is limited.

As the contacting methods, for example, (1) a method comprising the step of further carrying out at least one time contact with the halogenocompound after completion of any of methods mentioned above, and (2) a method comprising the step of further carrying out at least one time contact with a mixture of the halogenocompound and the electron donor compound after completion of any of methods mentioned above are further given.

Among these methods mentioned above, preferred are the method (2); the method (4); a method comprising the step of further carrying out at least one time contact with a mixture of the halogenocompound and the electron donor after completion of the method (4); and the method (7). Among these four methods, more preferred are the latter three methods. Particularly preferred are (1) a method comprising the steps of (i) adding a mixture of the halogenocompound and the ether, and the organic acid halide in this order to the solid component to effect the contact, thereafter (ii) adding thereto a mixture of the halogenocompound, the carboxylic acid ester and the ether to effect the contact, and further (iii) carrying out at least one time contact with a mixture of the halogenocompound and the ether, and (2) a method comprising the steps of (i) adding the carboxylic acid ester to the solid component to effect the contact, thereafter (ii) adding therto a mixture of the halogenocompound, the carboxylic acid ester and the ether to effect the contact, and further (iii) carrying out at least one time contact with a mixture of the halogenocompound and the ether.

How to contact is not limited. For example, a mechanical pulverization method using an apparatus such as a ball mill and a slurry method are given. The former method is not preferred from an industrial point of view, because the obtained solid catalyst component may contain a lot of fine powders, and as a result, a particle size distribution thereof may be broad. Thus, preferred is a method wherein the contact is carried out in the presence of a diluent. The solid catalyst component obtained according to the contact mentioned above can be used as it is. However, it is recommendable to wash the component obtained preferably with a diluent inert thereto, thereby removing unnecessaries in the component.

Examples of the diluent are aliphatic hydrocarbons such as pentane, hexane, heptane and octane; aromatic hydrocarbons such as benzene, toluene and xylene; alicyclic hydrocarbons such as cyclohexane and cyclopentane; and halogenated hydrocarbons such as 1,2-dichloroethane and monochlorobenzene.

An amount of the diluent used per one contact is usually from 0.1 ml to 1000 ml, and preferably from 1 ml to 100 ml, per 1 g of the solid component. An amount of the diluent used per one washing is almost the same as that mentioned above. Washing is carried out usually from 1 to 5 times per one contact.

A temperature at which contacting and washing are carried out is usually from −50 to 150° C., preferably from 0 to 140° C., and more preferably from 60 to 135° C. A contact time is not particularly limited, and preferably from 0.5 to 8 hours, and more preferably from 1 to 6 hours. A washing time is not also particularly limited, and preferably from 1 to 120 minutes, and more preferably from 2 to 60 minutes.

An amount of the halogenocompound used is usually from 0.5 to 1000 mmol, preferably from 1 to 200 mmol, and more preferably from 2 to 100 mmol, per 1 g of the solid component.

It is recommendable to use the halogenocompound in combination with the electron donor. In such a case, the electron donor is used in an amount of usually from 1 to 100 mol, preferably from 1.5 to 75 mol, and more preferably from 2 to 50 mol, per one mol of the halogenocompound.

The amount of the electron donor is usually from 0.01 to 100 mmol, preferably from 0.05 to 50 mmol, and more preferably from 0.1 to 20 mmol, per one g of the solid component. When the amount exceeds 100 mmol, the solid component particle may collapse.

The organic acid halide is used in an amount of usually from 0.1 to 100 mmol, preferably from 0.3 to 50 mmol, and more preferably from 0.5 to 20 mmol, per one g of the solid component; and usually from 0.01 to 1.0 mol and preferably from 0.03 to 0.5 mol, per one mol of the magnesium atom in the solid component. When the former amount exceeds 100 mmol or the latter amount exceeds 1.0 mol, the solid component particle may collapse.

When two or more kinds of compounds mentioned above are used in more than one time contact, the amount mentioned above for respective compounds is that per one contact.

In using for the polymerization, the solid catalyst component obtained may be combined with an inert diluent to form a slurry, or may be dried to obtain a flowable powder. As a drying method, a method wherein a volatile matter is removed under reduced pressure, and a method wherein a volatile matter is removed under stream of an inert gas such as nitrogen and argon are exemplified. A drying temperature is preferably from 0 to 200° C., and more preferably from 50 to 100° C. A drying period of time is preferably from 0.01 to 20 hours, and more preferably from 0.5 to 10 hours.

The organoaluminum compound used in the present invention means a compound having at least one Al-carbon bond therein. Typical examples thereof are those represented by the following formulas. In the formulas, $R^{19}$ to $R^{23}$ are independently of one another a hydrocarbon group having 1 to 20 carbon atoms; Y is a halogen atom, a hydrogen atom or an alkoxy group; and w is a number satisfying $2 \leq w \leq 3$.

$$R^{19}_{w}AlY_{3-w}$$

$$R^{20}R^{21}Al\text{—}O\text{—}AlR^{22}R^{23}$$

Specific examples of the organoaluminum compound are trialkylaluminums such as triethylaluminum, tri-i-butylaluminum and trihexylaluminum; dialkylaluminum hydrides such as diethylaluminum hydride and di-i-butylaluminum hydride; dialkylaluminum halides such as diethylaluminum chloride; mixtures of trialkylaluminums and dialkylaluminum halides such as a mixture of triethylaluminum and diethylaluminum chloride; and alkylalumoxanes such as tetraethyldialumoxane and tetrabutyldialumoxane.

Among these, trialkylaluminums, mixtures of trialkylaluminums with dialkylaluminum halides, or alkylalumoxanes is preferred. Triethylaluminum, tri-i-butylaluminum, a mixture of triethylaluminum with diethylaluminum chloride, or tetraethyldialumoxane is particularly preferred.

The α-olefin used in the present invention means an α-olefin having at least 3 carbon atoms. Examples thereof are straight chain mono-olefins such as propylene, butene-1, pentene-1, hexene-1, heptene-1, octene-1 and decene-1; branched chain mono-olefins such as 3-methylbutene-1,3-methylpentene-1 and 4-methylpentene-1; vinylcyclohexane; and a combination of two or more thereof.

Of these, preferred is a homopolymerization of propylene or butene-1, or a copolymerization of a mixed olefin containing propylene or butene-1 as a main component, and particularly preferred is a homopolymerization of propylene, or a copolymerization of a mixed olefin containing propylene as a main component. In the copolymerization, (1) it is permitted to use a combination of at least two olefins selected from the group consisting of ethylene and the above-mentioned α-olefins or a combination of said olefin and a polyunsaturated bond-carrying compound such as a conjugated diene and a non-conjugated diene, and (2) it is permitted to carry out a hetero-block copolymerization through a two or more stage polymerization.

The catalyst for α-olefin polymerization used in the present invention can be obtained by contacting the above-mentioned solid catalyst component, organoaluminum compound and external donor with one another. How to contact them is not limited as far as said catalyst for polymerization can be obtained. For example, (1) a method wherein those three components per se are contacted with one another, (2) a method wherein those three components are respectively diluted with a solvent, followed by contact with one another, and (3) a method wherein those three components are separately supplied to a polymerization vessel, followed by contact with one another in the polymerization vessel are given. It is preferred that respective components are supplied to the polymerization vessel under water free conditions using an inert gas such as nitrogen and argon. It is permitted that any two or three of those three components are contacted in advance, and those contacted are supplied to the polymerization vessel.

In the process for producing an α-olefin polymer of the present invention, the above-mentioned catalyst itself may be used (said polymerization is hereinafter referred to as "real polymerization"). Alternatively, a pre-polymerized polymerization catalyst obtained by the below-mentioned pre-polymerization of said catalyst may be used for the real polymerization.

The pre-polymerized polymerization catalyst can usually be obtained by polymerizing (namely, pre-polymerizing) a small amount of an olefin in the presence of the above-mentioned solid catalyst component and organoaluminum compound. As a pre-polymerization process, it is recommendable to carry out a slurry polymerization process, wherein an inert hydrocarbon such as propane, butane, isobutane, pentane, isopentane, hexane, heptane, octane, cyclohexane, benzene and toluene is used as a solvent. The solvent may be partially or totally replaced with a liquefied olefin.

An amount of the organoaluminum compound used in the pre-polymerization is usually from 0.5 to 700 mol, preferably from 0.8 to 500 mol, and particularly preferably from 1 to 200 mol, per 1 mol of the titanium atom contained in the solid catalyst component.

An amount of the olefin pre-polymerized is usually from 0.01 to 1000 g, preferably from 0.05 to 500 g, and particularly preferably from 0.1 to 200 g, per 1 g of the solid catalyst component.

A slurry concentration in the above-mentioned slurry polymerization process is preferably from 1 to 500 g-solid catalyst component/liter-solvent, and particularly preferably from 3 to 300 g-solid catalyst component/liter-solvent. A pre-polymerization temperature is preferably from −20 to 100° C., and particularly preferably from 0 to 80° C. A partial pressure of the olefin in a gas phase of the pre-polymerization is preferably from 0.01 to 20 kg/cm$^2$, and particularly preferably from 0.1 to 10 kg/cm$^2$. However, said partial pressure is not limited to an olefin, which is liquid under the pressure and at the temperature of the pre-polymerization. A pre-polymerization period of time is not particularly limited, and preferably usually from 2 minutes to 15 hours.

As a method for feeding the solid catalyst component, the organoaluminum compound and the olefin into a pre-polymerization vessel, there are exemplified (1) a method comprising the steps of feeding the solid catalyst component and the organoaluminum compound, and thereafter feeding the olefin, and (2) a method comprising the steps of feeding the solid catalyst component and the olefin, and thereafter feeding the organoaluminum compound. As a method for feeding the olefin to a polymerization vessel, there are exemplified (1) a method comprising the step of feeding the olefin successively so as to keep a pressure in the polymerization vessel to a pre-determined degree, and (2) a method comprising the step of feeding a pre-determined total amount of the olefin at the same time. In order to regulate a molecular weight of the olefin polymer obtained by the pre-polymerization, a chain transfer such as hydrogen may be used.

If desired, the above-mentioned external donor (namely, outer donor) may be used in the pre-polymerization. An amount of the outer donor used in the pre-polymerization is usually from 0.01 to 400 mol, preferably from 0.02 to 200 mol, and particularly preferably from 0.03 to 100 mol, per 1 mol of the titanium atom contained in the solid catalyst component, and usually from 0.003 to 5 mol, preferably from 0.005 to 3 mol, and particularly preferably from 0.01 to 2 mol, per 1 mol of the organoaluminum compound.

In the pre-polymerization, a method for feeding the outer donor into a pre-polymerization vessel is not particularly limited. As said a method, there are exemplified (1) a method comprising the step of feeding the outer donor only, and (2) a method comprising the step of feeding a contact product between the outer donor and the organoaluminum compound. The olefin used in the pre-polymerization may be the same as or different from that used in the real polymerization in its kind.

As a method for the real polymerization, there are exemplified (1) a method comprising the step of polymerizing the olefin in the presence of a catalyst obtained by contacting the solid catalyst component, the organoaluminum compound and the outer donor with one another, (2) a method comprising the step of polymerizing the olefin in the presence of the pre-polymerized catalyst, and (3) a method comprising the step of polymerizing the olefin in the presence of a contact product among the pre-polymerized catalyst, the organoaluminum compound and the outer donor.

An amount of the organoaluminum compound used in the real polymerization is usually from 1 to 1000 mol, and particularly preferably from 5 to 600 mol, per 1 mol of the titanium atom contained in the solid catalyst component.

An amount of the outer donor used in the real polymerization is usually from 0.1 to 2000 mol, preferably from 0.3 to 1000 mol, and particularly preferably from 0.5 to 800 mol, per 1 mol of the titanium atom contained in the solid catalyst component, and usually from 0.001 to 5 mol, preferably from 0.005 to 3 mol, and particularly preferably from 0.01 to 1 mol, per 1 mol of the organoaluminum compound.

A polymerization temperature in the real polymerization is usually from −30 to 300° C., and preferably from 20 to 180° C. A polymerization pressure is not particularly limited, and from an industrial or an economical point of view, it is generally from atmospheric pressure to 100 kg/cm$^2$, and preferably from about 2 to about 50 kg/cm$^2$. A polymerization manner may be either a batch type or a continuous type. As a polymerization process, there are exemplified a slurry polymerization process using an inert hydrocarbon solvent such as propane, butane, isobutane, pentane, hexane, heptane and octane; a solution polymerization process using said solvent; a bulk polymerization process using an olefin as a medium, which olefin is liquid at a polymerization temperature; and a gas phase polymerization process. In the real polymerization, a chain transfer agent such as hydrogen may be used in order to regulate a molecular weight of the olefin polymer obtained.

EXAMPLE

The present invention is explained in detail with reference to Examples and Comparative Examples as follows, but the present invention is not limited to those Examples.

Various physical properties of polymers were measured as follows.

1. 20° C. Xylene-soluble portion (CXS value (% by weight) CXS was measured according to the steps of:
   (1) dissolving 1 g of the polymer in 200 ml of boiled xylene to obtain a solution,
   (2) cooling gradually the solution to 50° C.,
   (3) immersing the cooled solution in ice water under stirring, whereby the solution is cooled to 20° C.,
   (4) continuing the cooling at 20° C. for 3 hours to precipitate a polymer,
   (5) separating the precipitated polymer by filtration to obtain a filtrate, and
   (6) weighing a polymer in the filtrate, which polymer is a 20° C. Xylene-soluble portion, to obtain the weight (W g) thereof.

A value calculated by 100×W is assigned to be CXS (wt %). The smaller the CXS value, the higher the stereospecificity of the polymer.

2. Intrinsic viscosity ($[\eta]$)
   An intrinsic viscosity of a polymer was measured in a tetralin solvent at 135° C. using an Ubbellohde viscometer.

3. Bulk density (g/ml)
   A bulk density of a polymer was measured according to JIS K-6721 (1966).

4. Composition analysis
   (1) Titanium atom content
      The titanium atom content in a solid sample was measured according to a method comprising the steps of:
      (i) decomposing a solid sample with diluted sulfuric acid,
      (ii) adding an excess amount of hydrogen peroxide aqueous solution thereto to obtain a liquid sample,
      (iii) measuring a 410 nm characteristic absorption of the liquid sample using a double beam spectrophotometer, Type U-2001, manufactured by Hitachi, Ltd., and
      (iv) finding the titanium atom content from the characteristic absorption obtained and a calibration curve otherwise prepared separately.
   (2) Alkoxy group content
      The alkoxy group content in a solid sample was measured according to a method comprising the steps of:
      (i) decomposing a solid sample with water to obtain a liquid sample,
      (ii) measuring a content of an alcohol corresponding to the alkoxy group in the liquid sample according to a gas chromatography internal standard method, and
      (iii) converting the alcohol content obtained into an alkoxy group content.
   (3) Carboxylic acid ester content
      The carboxylic acid ester content in a solid sample was measured according to a method comprising the steps of:
      (i) decomposing a solid sample with water to obtain a liquid sample,
      (ii) extracting a soluble component in the liquid sample with a saturated hydrocarbon solvent to obtain an extract, and
      (iii) measuring a content of the carboxylic acid ester in the liquid sample according to a gas chromatography internal standard method.

Example 1

1. Production of Solid Catalyst Component
   In a flask equipped with a stirrer, which had been purged with nitrogen, 3.99 g of anhydrous magnesium chloride, 17.8 ml of decane and 19.8 ml of 2-ethylhexanol were introduced, and thereafter the mixture was stirred at 135° C. for 2 hours, thereby obtaining a uniform solution. Further, 1.30 g of 2,2-diisobutyl-1,3-dimethoxypropane was added thereto, and the mixture was stirred at 135° C. for 1 hour and then cooled to ambient temperature.

On the other hand, in a flask equipped with a stirrer, which had been purged with nitrogen, 100 ml of titanium tetrachloride was introduced and then cooled to −20° C. To this, the above-mentioned solution was dropped over 1 hour, so that an inner temperature did not exceed 15° C., and thereafter the temperature was raised to 110° C. over 5 hours. Successively, 1.92 g of 2,2-diisobutyl-1,3-dimethoxypropane was added thereto, and the mixture was stirred at 110° C. for 2 hours. The resulting slurry was filtered, and a solid was washed 10 times with each 30 ml of decane at 110° C., further washed 3 times with each 30 ml of hexane at ambient temperature, and then dried, thereby obtaining a solid catalyst component. A titanium atom content in the solid catalyst component was found to be 2.14% by weight.

2. Polymerization of Propylene

A stainless steel autoclave having an inner volume of 3 liters was purged with argon, 2.6 mmol of triethylaluminum, 0.26 mmol of 1,3-dioxolan and 8.00 mg of the solid catalyst component obtained in the above item 1 were fed therein, and hydrogen was added thereto in an amount corresponding to a partial pressure of 0.033 MPa. Successively, 780 g of liquefied propylene was fed therein. A temperature of the autoclave was raised to 80° C., and polymerization was continued at 80° C. for 1 hour. After completion of the polymerization, the unreacted monomer was removed. The polymer produced was dried under reduced pressure, thereby obtaining 176 g of polypropylene powder.

Yield of the polypropylene per one g of the solid catalyst component (hereinafter abbreviated as "PP/cat") was found to be 22000 g/g, and CXS, [η] and bulk density of the polymer were found to be 2.4 wt %, 1.56 dl/g and 0.378 g/ml, respectively.

Comparative Example 1

1. Polymerization of Propylene

Example 1-2 was repeated except that 1,3-dioxolan was not used, and 10.3 mg of the solid catalyst component was fed.

PP/cat was found to be 26900 g/g; CXS was found to be 3.5 wt %, which was higher than that (2.4 wt %) obtained in Example 1 using 1,3-dioxolan; [η] and bulk density were found to be 1.59 dl/g and 0.370 g/ml, respectively.

Example 2

1. Production of Solid Component

In a reactor equipped with a stirrer, which had been purged with nitrogen, 14.5 kg of diisobutyl phthalate, 670 liters of hexane, 349 kg of tetraethoxysilane and 38 kg of tetrabutoxytitanium were introduced, and the mixture was stirred. Successively, 890 liters of a dibutyl ether solution of butylmagnesium chloride (concentration 2.1 mol/liter) was dropped to the above stirred mixture over 5 hours while maintaining a temperature of the reactor at 8° C. After completion of dropping, the mixture was stirred at 20° C. for 1 hour and then filtered, and the obtained solid product was washed 3 times with each 1100 liters of toluene at ambient temperature. To the washed solid product, toluene was added so as to make a total volume of 843 liters, thereby obtaining a slurry.

2. Production of Solid Catalyst Component

To the slurry obtained in the above item 1, 441 liters of toluene was added, and the mixture was stirred at 105° C. for 1 hour. To this, 200 liters of toluene and 222 kg of diisobutyl phthalate were added, and the mixture was stirred at 95° C. for a half hour. Thereafter, the mixture was filtered, and the obtained solid was washed 2 times with each 1100 liters of toluene. To the washed solid, toluene was added so as to make a total volume of 843 liters, thereby obtaining a slurry. Successively, 19.0 kg of dibutyl ether, 15.0 kg of diisobutyl phthalate and 737 kg of titanium tetrachloride were added thereto, and the mixture was stirred at 105° C. for 3 hours. Thereafter, the mixture was filtered, and washing with 1100 liters of toluene was repeated 3 times at 95° C., and toluene was added thereto so as to make a total volume of 843 liters, thereby obtaining a slurry. Successively, 19.0 kg of dibutyl ether and 368 kg of titanium tetrachloride were added thereto and the mixture was stirred at 105° C. for 1 hour. Thereafter, the mixture was filtered, and the obtained solid was washed 4 times with each 1100 liters of toluene at 95° C., further washed 3 times with each 1000 liters of hexane at ambient temperature, and then dried, thereby obtaining a solid catalyst component.

The solid catalyst component was found to contain 2.0% by weight of a titanium atom, 10.5% by weight of a phthalic acid ester, 0.6% by weight of an ethoxy group and 0.2% by weight of a butoxy group.

3. Polymerization of Propylene

A stainless steel autoclave having an inner volume of 0.1 liter was purged with argon, 0.57 mmol of triethylaluminum, 0.057 mmol of 1, 3-dioxolan and 3.65 mg of the solid catalyst component obtained in the above item 2 were fed therein. Successively, 40 g of liquefied propylene was fed therein. A temperature of the autoclave was raised to 60° C., and polymerization was continued at 60° C. for 1 hour. After completion of the polymerization, the unreacted monomer was removed. The polymer produced was dried under reduced pressure, thereby obtaining 17.3 g of polypropylene powder. PP/cat and CXS were found to be 4700 g/g and 17.9 wt %, respectively.

Comparative Example 2

1. Polymerization of Propylene

Example 2-3 was repeated except that 1,3-dioxolan was not used, and 2.13 mg of the solid catalyst component was fed.

PP/cat was found to be 6300 g/g; and CXS was found to be 28.9 wt %, which was higher than that (17.9 wt %) obtained in Example 2 using 1,3-dioxolan.

Example 3

1. Polymerization of Propylene

A stainless steel autoclave having an inner volume of 3 liters was purged with argon, 2.6 mmol of triethylaluminum, 0.26 mmol of 1,3-dioxolan, 0.26 mmol of cyclohexylethyldimethoxysilane and 6.13 mg of the solid catalyst component obtained in Example 2-2 were fed therein. Successively, hydrogen was added thereto in an amount corresponding to a partial pressure of 0.033 MPa. Further, 780 g of liquefied propylene was fed therein. A temperature of the autoclave was raised to 80° C., and polymerization was continued at 80° C. for 1 hour. After completion of the polymerization, the unreacted monomer was removed. The polymer produced was dried under reduced pressure, thereby obtaining 186 g of polypropylene powder. PP/cat, CXS, [η] and bulk density were found to be 30300 g/g, 0.69 wt %, 2.14 dl/g and 0.392 g/ml, respectively.

Example 4
1. Polymerization of Propylene

Example 3-1 was repeated except that 0.13 mmol of 1,3-dioxolan and 6.6 mg of the solid catalyst component were fed.

PP/cat, CXS, [η] and bulk density were found to be 30200 g/g, 0.79 wt %, 2.07 dl/g and 0.397 g/ml, respectively.

Example 5
1. Polymerization of Propylene

Example 3-1 was repeated except that 1,3-dioxolan was changed to 1,3-dioxane, and 8.37 mg of the solid catalyst component was fed.

PP/cat, CXS, [η] and bulk density were found to be 30900 g/g, 0.80 wt %, 2.30 dl/g and 0.388 g/ml, respectively.

Example 6
1. Polymerization of Propylene

Example 3-1 was repeated except that 1,3-dioxolan was changed to 2-methyl-1,3-dioxolan, and 8.88 mg of the solid catalyst component was fed.

PP/cat, CXS, [η] and bulk density were found to be 29200 g/g, 0.76 wt %, 2.19 dl/g and 0.390 g/ml, respectively.

Example 7
1. Polymerization of Propylene

Example 3-1 was repeated except that 1,3-dioxolan was changed to 3,3-dimethoxyhexane, and 6.82 mg of the solid catalyst component was fed.

PP/cat, CXS, [η] and bulk density were found to be 26500 g/g, 0.95 wt %, 2.21 dl/g and 0.394 g/ml, respectively.

Comparative Example 3
1. Polymerization of Propylene

Example 3-1 was repeated except that 1,3-dioxolan was not used, and 5.26 mg of the solid catalyst component was fed.

PP/cat was found to be 37100 g/g; and CXS was found to be 1.1 wt %, which was higher than that (0.69 wt %) obtained in Example 3 using 1,3-dioxolan.

[η] and bulk density were found to be 2.12 dl/g and 0.399 g/ml, respectively.

Example 8
1. Polymerization of Propylene

Example 3-1 was repeated except that cyclohexylethyldimethoxysilane was changed to t-butyl-n-propyldimethoxysilane, and 6.10 mg of the solid catalyst component was fed.

PP/cat, CXS, [η] and bulk density were found to be 33900 g/g, 0.60 wt %, 2.97 dl/g and 0.394 g/ml, respectively.

Comparative Example 4
1. Polymerization of Propylene

Example 8-1 was repeated except that 1,3-dioxolan was not used, and 7.96 mg of the solid catalyst component was fed.

PP/cat was found to be 40700 g/g; and CXS was found to be 0.82 wt %, which was higher than that (0.60 wt %) obtained in Example 8 using 1,3-dioxolan. [η] and bulk density were found to be 3.23 dl/g and 0.396 g/ml, respectively.

Example 9
1. Polymerization of Propylene

Example 3-1 was repeated except that cyclohexylethyldimethoxysilane was changed to bisperhydroisoquinolinodimethoxysilane, 6.48 mg of the solid catalyst component was fed, and a partial pressure of hydrogen was changed to 0.20 MPa.

PP/cat, CXS, [η] and bulk density were found to be 19300 g/g, 0.89 wt %, 1.73 dl/g and 0.394 g/ml, respectively.

Comparative Example 5
1. Polymerization of Propylene

Example 9-1 was repeated except that 1,3-dioxolan was not used, and 5.80 mg of the solid catalyst component was fed.

PP/cat was found to be 32800 g/g; and CXS was found to be 1.3 wt %, which was higher than that (0.89 wt %) obtained in Example 9 using 1,3-dioxolan. [η] and bulk density were found to be 1.57 dl/g and 0.395 g/ml, respectively.

Example 10
1. Production of Solid Catalyst Component

A 100 ml-volume flask equipped with a stirrer, a dropping funnel and a thermometer was purged with nitrogen. A toluene slurry obtained in the same manner as in Example 2-1 was introduced thereto in an amount of 8 g in terms of a solid, and thereafter toluene was withdrawn therefrom so as to make the slurry volume of 26.5 ml.

The slurry was maintained at about 40° C., and a mixture of 16.0 ml of titanium tetrachloride and 0.8 ml of dibutyl ether was added thereto. Further, a mixture of 2.4 ml of phthalic acid chloride and 2.4 ml of toluene was dropped thereto over 7.5 minutes, and after completion of dropping, the resulting mixture was stirred at 115° C. for 3 hours.

The reaction mixture was subjected to solid-liquid separation at 115° C., and the obtained solid was washed 3 times with each 40 ml of toluene at 115° C. Toluene was added to the washed solid to form 26.5 ml of a toluene slurry, which was then heated to 105° C.

A mixture of 0.8 ml of dibutyl ether and 16 ml of titanium tetrachloride was added thereto, and the mixture was stirred at 105° C. for 1 hour. After completion of stirring, the mixture was subjected to solid-liquid separation at 105° C., and the obtained solid was washed 2 times with each 40 ml of toluene at 105° C.

To the washed solid, toluene was added to form 26.5 ml of a toluene slurry, which was then heated to 105° C. A mixture of 0.8 ml of dibutyl ether and 16 ml of titanium tetrachloride was added thereto, and the mixture was stirred at 105° C. for 1 hour. After completion of stirring, the mixture was subjected to solid-liquid separation at 105° C., and the obtained solid was washed 2 times with each 40 ml of toluene at 105° C.

To the washed solid, toluene was added to form 26.5 ml of a toluene slurry, which was then heated to 105° C. A mixture of 0.8 ml of dibutyl ether and 16 ml of titanium tetrachloride was added thereto, and the mixture was stirred at 105° C. for 1 hour. After completion of stirring, the mixture was subjected to solid-liquid separation at 105° C., and the obtained solid was washed 3 times with each 40 ml of toluene at 105° C. The washed solid was dried under reduced pressure, thereby obtaining 7.80 g of a solid catalyst component.

The solid catalyst component was found to contain 2.34% by weight of a titanium atom, 14.06% by weight of a phthalic acid ester, 0.04% by weight of an ethoxy group and 0.08% by weight of a butoxy group.

2. Polymerization of Propylene

Polymerization was carried out in the same as in Example 3-1, except that cyclohexylethyldimethoxysilane was changed to dicyclopentyldimethoxysilane, and the solid catalyst component was changed to 6.43 mg of the solid catalyst component obtained in the above item 1.

PP/cat, CXS, [η] and bulk density were found to be 39300 g/g, 0.19 wt %, 3.04 dl/g and 0.411 g/ml, respectively.

Example 11
1. Polymerization of Propylene

Example 3-1 was repeated except that the solid catalyst component was changed to 9.73 mg of the solid catalyst component obtained in Example 1-1.

PP/cat, CXS, [η] and bulk density were found to be 19300 g/g, 1.6 wt %, 1.65 dl/g and 0.385 g/ml, respectively.

Comparative Example 6
1. Polymerization of Propylene

Example 11-1 was repeated except that 1,3-dioxolan was not used, and 7.53 mg of the solid catalyst component was fed.

PP/cat was found to be 26800 g/g; and CXS was found to be 1.9 wt %, which was higher than that (1.6 wt %) obtained in Example 11 using 1,3-dioxolan. [η] and bulk density were found to be 1.60 dl/g and 0.383 g/ml, respectively.

Example 12
1. Polymerization of Propylene

A 3 liter-volume stainless steel autoclave was purged with argon, 2.6 mmol of triethylaluminum, 0.26 mmol of 1,3-dioxolan, 0.26 mmol of 2,2-diisobutyl-1,3-dimethoxypropane and 16.92 mg of the solid catalyst component obtained in Example 2-2 were fed therein. Successively, hydrogen was added thereto in an amount corresponding to a partial pressure of 0.033 MPa. Further, 780 g of liquefied propylene was fed therein. A temperature of the autoclave was raised to 80° C., and polymerization was continued at 80° C. for 1 hour. After completion of the polymerization, the unreacted monomer was removed. The polymer produced was dried under reduced pressure, thereby obtaining 170 g of polypropylene powder.

PP/cat, CXS, [η] and bulk density of the polymer were found to be 10000 g/g, 1.2 wt %, 1.55 dl/g and 0.370 g/ml, respectively.

Comparative Example 7
1. Polymerization of Propylene

Example 12 was repeated except that 1,3-dioxolan was not used, and 8.64 mg of the solid catalyst component was fed.

PP/cat was found to be 17900 g/g; and CXS was found to be 1.5 wt %, which was higher than that (1.2 wt %) obtained in Example 12 using 1,3-dioxolan. [η] and bulk density were found to be 1.65 dl/g and 0.393 g/ml, respectively.

Example 13
1. Polymerization of Propylene

A 0.1 liter-volume stainless steel autoclave was purged with argon, 0.57 mmol of triethylaluminum, 0.057 mmol of 1,3-dioxolan, 2,2,6,6-tetramethylpiperidine and 3.9 mg of the solid catalyst component obtained in Example 2-2 were fed therein. Successively, 40 g of liquefied propylene was fed therein. Thereafter, a temperature of the autoclave was raised to 60° C., and polymerization was continued at 60° C. for 1 hour. After completion of the polymerization, the unreacted monomer was removed. The polymer produced was dried under reduced pressure, thereby obtaining 24.8 g of polypropylene powder. PP/cat and CXS were found to be 6400 g/g and 3.8 wt %, respectively.

Example 14
1. Polymerization of Propylene

Example 13 was repeated except that 0.114 mmol of 1,3-dioxolan was used, and 5.3 mg of the solid catalyst component was used. PP/cat and CXS were found to be 5100 g/g and 3.1 wt %, respectively.

Example 15
1. Polymerization of Propylene

Example 13 was repeated except that 1,3-dioxolan was changed to 0.057 mmol of 1,3-dioxane, and 3.5 mg of the solid catalyst component was fed. PP/cat and CXS were found to be 6200 g/g and 4.3 wt %, respectively.

Comparative Example 8
1. Polymerization of Propylene

Example 13 was repeated except that 1,3-dioxolan was not used, 4.0 mg of the solid catalyst component was fed, and the polymerization time was changed to 42 minutes.

PP/cat was found to be 9600 g/g; and CXS was found to be 5.7 wt %, which was higher than that (3.8 wt %) obtained in Example 13 using 1,3-dioxolan.

What is claimed is:

1. A process for producing a catalyst for α-olefin polymerization, which comprises the step of contacting (1) a solid catalyst component having Ti, Mg and a halogen as essential components, (2) an organoaluminum compound, (3) a compound having a —C—O—C—O—C— bond group and (4) an alkoxysilicon compound with one another.

2. The process for producing a catalyst for α-olefin polymerization according to claim 1, wherein the compound having a —C—O—C—O—C— bond group contains a compound having a —C—O—C—O—C— bond group in a closed ring structure.

3. The process for producing a catalyst for α-olefin polymerization according to claim 1, wherein the solid catalyst component further has an organic acid ester or an ether.

4. The process for producing a catalyst for α-olefin polymerization according to claim 1, wherein the solid catalyst component is produced by a process comprising the step of contacting (1) a solid component having a magnesium atom, a titanium tom and a hydrocarbyloxy group, (2) a halogenocompound having halogenation ability and (3) an electron donor and/or an organic acid halide.

5. A process for producing an α-olefin polymer, which comprises the step of homopolymerizing or copolymerizing an α-olefin in the presence of a catalyst for α-olefin polymerization produced by the process according to claim 1.

* * * * *